(12) United States Patent
De Ambrosi et al.

(10) Patent No.: US 7,939,512 B2
(45) Date of Patent: May 10, 2011

(54) MULTISTEP PROCESS FOR THE PHYSICAL DEPOLYMERIZATION OF HEPARIN AND PRODUCTS OBTAINED THEREFROM

(75) Inventors: Luigi De Ambrosi, Santhià (IT); Sergio Gonella, Santhià (IT); Donata Bensi, Vercelli (IT); Giangiacomo Torri, Milan (IT); Antonella Bisio, Pavia (IT); Elena Vismara, Milan (IT)

(73) Assignee: Laboratori Derivati Organici SpA, Milan (IT)

( * ) Notice: Subject to any disclaimer, the term of this patent is extended or adjusted under 35 U.S.C. 154(b) by 0 days.

(21) Appl. No.: 11/279,699

(22) Filed: Apr. 13, 2006

(65) Prior Publication Data

US 2007/0082869 A1    Apr. 12, 2007

Related U.S. Application Data

(63) Continuation of application No. PCT/EP2004/052531, filed on Oct. 13, 2004.

(51) Int. Cl.
*A61K 31/727* (2006.01)
*C08B 37/10* (2006.01)

(52) U.S. Cl. .............. 514/56; 536/21; 536/124
(58) Field of Classification Search .............. 514/56; 536/21, 124
See application file for complete search history.

(56) References Cited

U.S. PATENT DOCUMENTS

| | | | | |
|---|---|---|---|---|
| 4,788,307 A | * | 11/1988 | Lormeau et al. | 536/21 |
| 4,987,222 A | * | 1/1991 | De Ambrosi et al. | 536/21 |
| 6,075,013 A | * | 6/2000 | Weitz et al. | 514/56 |
| 7,091,337 B2 | * | 8/2006 | De Ambrosi et al. | 536/124 |

FOREIGN PATENT DOCUMENTS

| | | |
|---|---|---|
| EP | 0269937 | 6/1988 |
| WO | WO0069444 | 11/2000 |
| WO | WO 03/076474 | * 9/2003 |

OTHER PUBLICATIONS

Bisio et al, Carbohydrate Polymers, 2004, 55, 101-112.*
International Search Report, Apr. 13, 2005.

* cited by examiner

*Primary Examiner* — Shaojia Anna Jiang
*Assistant Examiner* — Ganapathy Krishnan
(74) *Attorney, Agent, or Firm* — Baker Botts L.L.P.

(57) ABSTRACT

The present invention is directed to a multistep process for the physical depolymerization of heparin wherein heparin is subjected to at least two γ-ray irradiations and wherein between two irradiation steps the depolymerised heparin is subjected to a separation step and only a fraction of the depolymerised heparin obtained from the first irradiation is subjected to the second irradiation step. It is also directed to heparin-derived oligosaccharide fractions obtainable by the process of the invention.

13 Claims, 1 Drawing Sheet

MULTISTEP PROCESS FOR THE PHYSICAL DEPOLYMERIZATION OF HEPARIN AND PRODUCTS OBTAINED THEREFROM

CROSS-REFERENCE TO RELATED APPLICATION

This Application is a continuation of International Application No. PCT/EP2004/052531 filed Oct. 13, 2004.

BACKGROUND

Heparin is an heterogeneous, polydisperse, highly sulfated polysaccharide belonging to the family of glycosaminoglycans, made up of 1→4 linked disaccharide repeating units, consisting of an α-D-glucosamine (A) and a hexuronic acid, α-L-iduronic (I) or β-D-glucuronic (G) acid, with O-sulfate groups at different positions of the disaccharide unit, especially at position 2 of the iduronic ($I_{2S}$) and position 3 and 6 of the glucosamine ($A_{3S}$; $A_{6S}$), and N-sulfate or N-acetyl groups at position 2 of the glucosamine residue($A_{NS}$; $A_{NAc}$). The most frequently occurring repeating disaccharide sequence is (1→4)-α-L-iduronic acid-2-O-sulfate-(1→4)-α-D-glucosamine-N,6-disulfate (1→($I_{2S}$-$A_{NS,6S}$), which represents the heparin highly sulfated segment, located closer to the non-reducing terminal of the heparin chain. Undersulfated sequences, accounted for by nonsulfated I and G, and $A_{NAc}$ are prevalently located toward the reducing end of the polymer. About one third of heparin chains contains a specific pentasaccharidic sequence, characterized by a central ANS, 6S residue bearing an extra sulfate group at position 3 ($A_{NS,3S,6S}$), constituting the active site for antithrombin III (AT). Many biochemical models as well as structural studies suggest that such pentasaccharide is located between the highly sulfated and the undersulfated domains. A minor sequence, involving neutral residues as galactose and xylose and corresponding to the reducing end of the polysaccharide chain, is the linkage region (LR) to the core protein of the proteoglycan.

The large number of possible structural variants of heparin sequences accounts for the wide range of biological activities that heparin promotes by binding to different plasma and tissue proteins, such as protease inhibitors of blood coagulation cascade, growth factors, chemokines, adhesive matrix proteins, etc. (Capila, & Linhardt, 2002). The identification of specific heparin structures responsible for binding to various protein ligands is of increasing interest. While some proteins, as AT, have affinity only for unique irregularities of heparin structure, others recognize the most regular regions of heparin, though this fact does not exclude selectivity of binding (Maccarana, Casu, & Lindahl, 1993).

Depending on their size and structural arrangement, heparin-derived oligosaccharides may elicit or inhibit specific biological effects. Typically, heparin sequences with a length ranging from tetra to decasaccharides are responsible for modulation of biological activity of proteins.

Different low and ultra low molecular weight heparin derivatives, ranging from 1900 to 4600 D, were recently demonstrated to cross the blood-brain barrier (BBB) in rats after oral or intravenous administration and to exhert a neuroprotective effect, potentially exploitable in the therapeutic treatment of neurodegenerative disorders. It is currently unclear what molecular weight fraction of these heterogeneous compounds crosses the BBB, and also what structural requirement is related to the biological action in the brain. The structural heterogeneity of heparin greatly influences the structure of the corresponding oligosaccharides. Moreover, each depolymerization reaction used for their preparation presents its own preferential selectivity, respect sequences and/or residues, and also usually modify at least the monosaccharide at the site of cleavage, generating further structural diversities.

U.S. Pat. No. 4,987,222 discloses a method for the depolymerization of heparin by the use of γ-rays. The examples disclose the preparation of heparin of average molecular weight by weight ($M_w$) around 5000 D and with a high S content. The patent shows a direct relationship between the amount of radiation and the reduction in $M_w$. However, the use of radiation according to U.S. Pat. No. 4,987,222 makes it possible only a limited reduction in $M_w$ of heparin. Once a certain value of radiation is overcome, the colour becomes dark.

The degradation of heparin by γ-rays is strongly reduced when irradiating heparin in the presence of an organic compound as taught by WO 03/076474. The obtained depolymerised heparin is light in colour and does not require discolouration processes.

It has been surprisingly found that by combining at least two γ-ray irradiation processes with separation processes, it is possible to obtain heparin derived oligosaccharides having unique properties.

SUMMARY

The present invention relates to a multistep process for the physical depolymerization of heparin characterized by the use of at least two γ-ray irradiation steps wherein a separation step is performed between two irradiation steps and only a fraction of the depolymerised heparin is subjected to the subsequent irradiation step.

It also relates to the various type of heparin-derived oligosaccharides (HO) obtainable by this process.

FIGURES

Some specific example embodiments of the disclosure may be understood by referring, in part, to the following description and the accompanying drawings.

Figure 1:
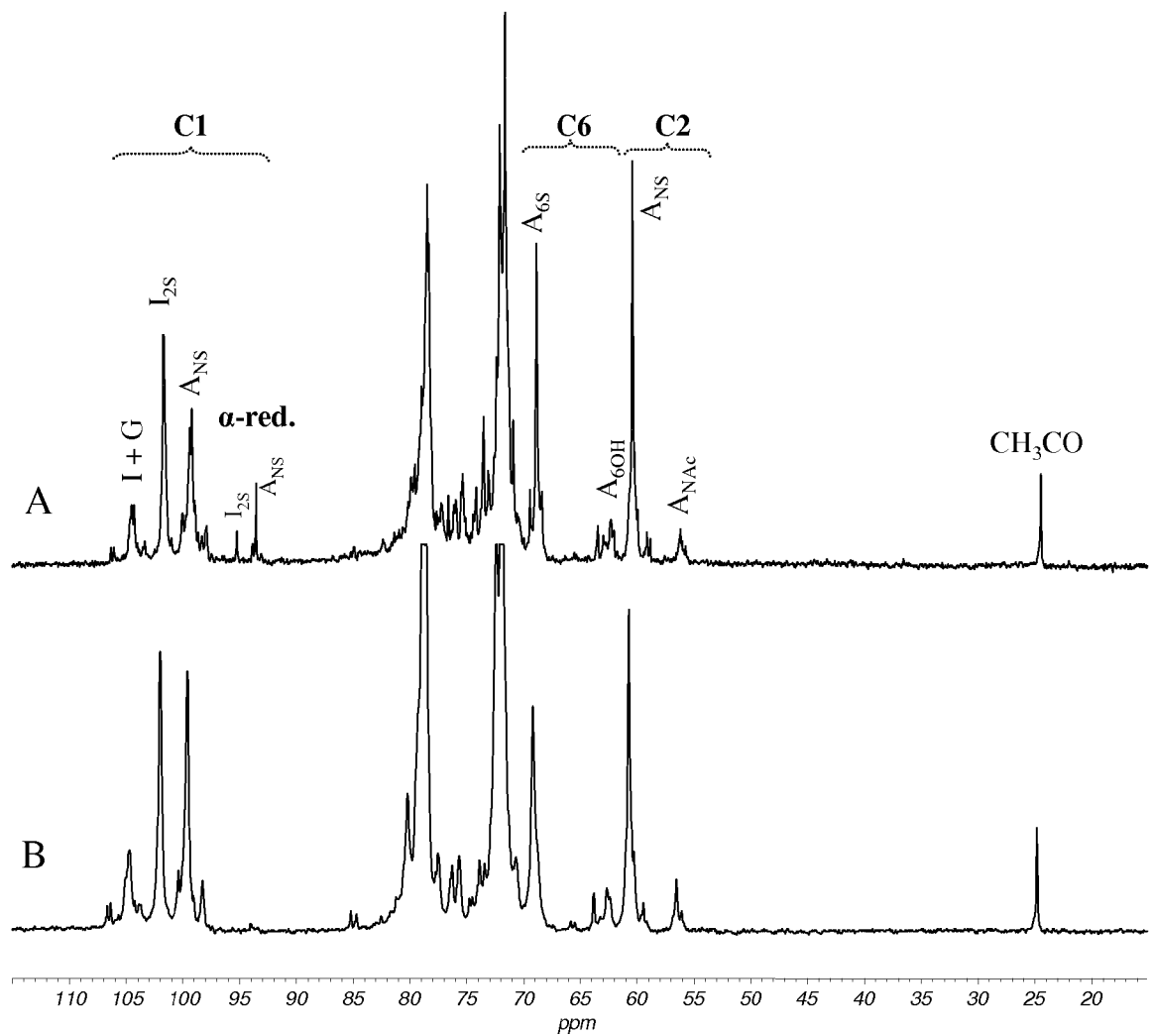
FIG. 1A shows the $^{13}C$ and $^1H$ spectra of γ-HO of the fraction of Example 1, according to a specific embodiment.
FIG. 1B shows the $^{13}C$ and $^1H$ spectra of γ-HO of unfractionated heparin (UFH).

While the present disclosure is susceptible to various modifications and alternative forms, specific example embodiments have been shown in the figures and are herein described in more detail. It should be understood, however, that the description of specific example embodiments is not intended to limit the invention to the particular forms disclosed, but on the contrary, this disclosure is to cover all modifications and equivalents as illustrated, in part, by the appended claims.

DESCRIPTION

The present invention relates to a multistep process for the physical depolymerization of heparin wherein heparin is subjected to at least two γ-ray irradiations and wherein between two irradiation steps the depolymerised heparin is subjected to a separation step. Only a fraction of the depolymerised heparin is subjected to the following irradiation step.

The process can be repeated again to a total of 3 or more irradiation steps.

The separation step can be any separation step known in the art, e.g. gel permeation chromatography, which separate the different fraction by molecular weight, ion exchange chromatography, which separate the fractions by charge density, ultrafiltration, and precipitation by using mono- or divalent ions.

Preferably, between two irradiation steps, it is used a gel permeation chromatography and the fraction subjected to further irradiation is the high molecular weight fraction. After the last irradiation step, it is possible to use gel permeation chromatography and/or ion exchange chromatography.

Preferably, the multistep process according to the invention comprises the following steps: subjecting a solution of heparin to a first γ-ray depolymerization step; subjecting the obtained heparin derived oligosaccharides to gel permeation chromatography separation, to isolate a high molecular weight fraction; subjecting the high molecular weight fraction to a second γ-ray treatment; subjecting the obtained heparin derived oligosaccharides to a gel permeation chromatography separation to isolate a fraction having $M_w$ comprised between 1300 and 3000 D, preferably between 1800 and 2800 D. More preferably, the process according to the invention further comprises a third irradiation and separation step, most preferably it comprises also a fourth irradiation and separation step.

In a further embodiment, the invention is directed to a variety of HO fractions obtainable according to the process of the invention and useful either as a product with potential pharmacological activity, or as an intermediate in the preparation of a pharmacological active compound.

A fraction obtained according to the process of the invention is characterized by $M_w$ comprised between 1200 and 3000 D, preferably between 1800 and 2800 D, and a concentration of β-D-glucuronic acid as measured by $^1H$ NMR equal to or lower than 19%, preferably equal to or lower than 17%, most preferably equal to or lower than 16%.

These oligosaccharides are enriched in I sulphated sequences, i.e. $I_{2S}$ and $A_{NS,6S}$.

Another fraction object of the invention has a N-acetyl glucosamine content equal to or higher than 20%, preferably equal to or higher than 22%, a content in $A_{NS,3S,6S}$ higher than 4%, and $M_w$ comprised between 3500 and 10000 D.

These characteristics render the structure heparansulphate-like and, thus, potentially of high practical interest.

A further fraction obtainable according to the invention has a content in $A_{NS,3S,6S}$ higher than 8% and $M_w$ comprised between 1200 and 3000 D, preferably between 1800 and 2800 D.

The process according to the invention is preferably performed by subjecting heparin to a first γ-ray treatment, followed by separation of the high molecular weight fraction from low molecular weight fraction. The high molecular weight fraction is again irradiated with γ-rays.

More preferably the irradiation and separation process is repeated for a third and optionally a fourth time.

It has been found that when comparing HO having similar $M_w$ but which underwent a different number of irradiation steps, the higher the number of irradiations, the lower is the concentration of G units.

Without being bound to any theory, it is possible that chain demolition of heparin by γ-rays prevalently degrades G units.

At the same time the concentration of $A_{NS,3S,6S}$ groups does not decrease, indicating that the oligosaccharide obtained by the process maintains activity towards antithrombin III, while decreasing the concentration of nonsulphated G groups.

Gamma radiation is preferably obtained from the following sources: $^{60}Co$ $^{241}Am$ $^{137}Cs$ and $^{226}Ra$; the most preferred γ-radiation is the one obtained from $^{60}Co$ as a source. $^{60}Co$ has a half life time of 5.3 years and emits two photons with energy of 1.17 and 1.33 MeV.

The amount of radiation used in the depolymerization process depends on several factors: the starting $M_w$ of heparin, the desired final $M_w$, the amount, and type of organic compound used. In fact, an increase in the amount of organic compound requires an increase in the amount of radiation to obtain the same reduction of $M_w$.

In general, the amount of radiation used in each depolymerization step will vary in the range 50-300 kGy, preferably 80-250 kGy, more preferably 100-200 kGy.

The irradiation step is preferably performed in the presence of an organic compound selected from the group consisting of alcohols, ethers, aldehydes, amides, and formic acid.

Preferably, the organic compound is selected from compounds of formula I, II and III.

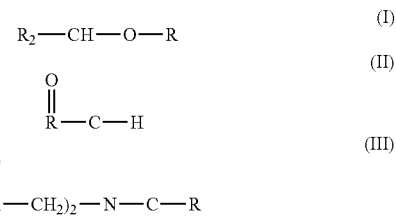

wherein each R is independently selected from the group consisting of H, OH, CHO, $C_1$-$C_6$ alkyl and acyl, optionally substituted by oxygen atoms; two R groups optionally join together to form a ring.

Preferred examples of alcohols are: methanol, ethanol, n-propanol, isopropanol, n-butanol, isobutanol, glycerol.

Preferred examples of ethers are: tetrahydrofurane, dioxane, diethylether, tertbutylmethylether, dioxolane.

Examples of aldehydes are formaldehyde, glyoxal, acetaldehyde, or stabilized forms thereof (trioxane, glyoxal trimeric dihydrate).

Preferred examples of amides are: N,N-dimethylformamide, N,N-dimethylacetamide, N,N-diethylformamide, N-methylpyrrolidone.

The concentration of heparin in the solution to be submitted to radiation can vary in a broad range. Preferably it is comprised between 2 and 25% w/v, more preferably between 5 and 15%.

The amount of organic compound according to the invention depends on several parameters, but it is generally comprised between 0.1 and 5% (v/v). When using an amount of radiation up to 100 kGy, the preferred amount of organic compound is comprised between 0.1 and 1%, while in the case of amount of radiation higher than 100 kGy, the preferred amount of organic compound is comprised between 0.2 and 2%.

EXAMPLES

Gamma Ray Irradiation

The system which conveys the products around the source is a "multipass" type: the containers go around a number of times which is directly proportional to the dose the product is to be subjected to.

During each pass the product receives a dose of about 25 kGy.

The time taken to complete the route once depends on the power (or activity) of the radioactive source; it is periodically adjusted following the natural decay of the source, or taking into account additions of radioactive isotope.

Products Characterizations

Molecular mass ($M_w$ and $M_n$) was determined by size exclusion chromatography (European Pharmacopoeia $4^{th}$ ed.: 2.2.30 and 2.2.46 for chromatography techniques and 01/2002:0828 p. 1297 for method).

Absorbance at 260 and 400 nm was determined according to European Pharmacopoeia $4^{th}$ ed 01/2002:0828 p. 1297.

Anti Xa activity was determined according to the method described in European Pharmacopoeia $4^{th}$ ed.: 2.2.30 and 2.2.46 for chromatography techniques and 01/2002:0828 p. 1297 for method.

NMR spectra—The proton spectra were obtained with a 500 MHz on a Bruker Avance spectrometer, equipped with gradient TXI 5 mm probe, at 60° C., with presaturation of the residual water signals, recycle delay of 12 seconds and number of scans 128. Samples were prepared by dissolving 10 mg of γ-HO or unfractionated heparin (UFH) in 0.5 mL of deuterium oxide (99.99%). The $^1H/^{13}C$ chemical shift correlation (HSQC) spectra were performed using z-gradients for coherence selection. They were obtained with carbon decoupling during acquisition period in phase sensitivity-enhanced pure absorption mode. The spectra were acquired with a nulling time of 2 s, 1024 data points in F2, 512 increments in F1, 32 scans per increment. The final matrix size was zero-filled to 4K×2K and multiplied with shifted ($\pi/3$) sine-bell-square prior Fourier transformation. Integration of cross-peak volumes was performed using Bruker XWINNMR 3.1 software package.

The carbon spectra were obtained at 100 MHz on a Bruker AMX400 spectrometer equipped with broadband 10 mm probe at 40° C. Protons were decoupled during the acquisition time. Recycle delay 4 s, number of scans 40,000. Samples were prepared by dissolving 250 mg of UFH or γ-HO in 2.5 mL of deuterium oxide.

Quantification of sulfation patterns—The percentage of the all possible substituents present on glucosamine or uronic acid rings were referred to the total area of glucosamine and uronic acid $^1H$ NMR signals respectively, and calculated as previously described (Guerrini, M., Bisio, A., & Torri, G.: "Combined quantitative $^1H$ and $^{13}C$ nuclear magnetic resonance spectroscopy for characterization of heparin preparations." *Semin. Thromb. Hemost.*, 27:473-482, 2001). In addition, the content of reducing 2-O-sulfated iduronic acid residues was calculated. Since H1 signal of $I_{2S}$ only accounts for the 1→4 linked residues, the percentage of the $I_{2S}$ at the reducing end was determined from the $^{13}C$-NMR spectra: the signal at 95 ppm was integrated, compared to ½ of the area of anomeric signals, and the resulting percentage was taken in account for the calculation of the amount of $I_{2S}$ obtained from proton spectra. Moreover, the percentage of total N-sulfated glucosamine ($A_{NS}$) residues, calculated by integration of the H2 signal, at 3.3 ppm, was split into $A_{NS}$ linked to iduronic acid ($A_{NS}$-I) and $A_{NS}$ linked to glucuronic acid ($A_{NS}$-G). This latter was quantified by integrating its anomeric proton signal, at 5.6 ppm, while $A_{NS}$-I was determined by the difference between total $A_{NS}$ and the H1 of $A_{NS}$-G.

Materials—Pig mucosal heparins were commercial preparations of unfractionated sodium salt heparin (UFH) from Laboratori Derivati Organici. Sephadex G50® was obtained from Amersham Pharmacia Biotech, Uppsala, Sweden. TSK columns were from Supelco, Bellefonte, Pa., USA. Human antihrombin, bovine factor Xa and synthetic substrate S-2765 were from Chromogenix (Mölndal, Sweden). All other reagents and chemicals were of research grade.

Example 1

An aqueous solution of pig mucosal heparin (10% w/v), in the presence of 0.4% (v/v) isopropanol and under nitrogen atmosphere, was submitted to ionizing radiation (180-200 kGy) The depolymerised heparin mixture was subjected to a bleaching treatment with oxidizing agents, according to typical industrial procedures for heparin preparations and then subjected to gel permeation chromatography on a Sephadex G50 column in order to separate higher (H, $M_w$>3500 D) and lower (L, $M_w$<1800 D) molecular weight species and isolate an intermediate fraction (γ-HO, $M_w$=1.800-2.800 D). Fraction H, separated from γ-HO-a was recovered and resubmitted to γ-ray treatment followed by gel chromatographic fractionation under the same conditions as above, obtaining fractions H2, HOa2, and L2. Then, fraction H2 was once again treated with γ-rays and fractionated as above, producing fractions H3, HO-a3, and L3.

All the different γ-HO analysed, prepared in the presence of isopropanol and both with a single (γ-HO-a) or additional (γ-HO-a2 and γ-HO-a3) γ-ray treatments, exhibited comparable and symmetrical HPLC elution profiles. Their polydispersity values are listed in Table 2, together with their resulting in vitro anticoagulant (anti Xa) activity, in comparison with the corresponding values of a typical UFH.

TABLE 1

| Sample | Pd | anti-Xa activity (U/mg) |
|---|---|---|
| UFH | 1.28 | 190 |
| γ-HO-a | 1.28 | 43 |
| γ-HO-a2 | 1.30 | 35 |
| γ-HO-a3 | 1.25 | 34 |

Typical $^{13}C$ and $^1H$ spectra of γ-HO of the fraction of Example 1 in comparison with the corresponding UFH sample are shown in FIG. 1. The profiles of oligosaccharide spectra are similar to that of parent heparin, with the differences typically induced by depolymerization, such as sharpening signal, because of reduced viscosity, and stronger resonances associated with chain terminals and sequence effects. For instance, the new signals at 93 and 95 ppm in the γ-HO $^{13}C$ spectrum (FIG. 1A), are attributed to the anomeric carbons of the reducing N,6-sulfated glucosamine and 2-sulfated iduronic acid residues, respectively.

From the comparison of proton spectra of γ-HO and parent heparin some diversities appear. The main difference is due to the impressive increase of intensity of the signal of the H4 of the non-reducing N,6-sulfated glucosamine residue at 3.56 ppm (Compare FIG. 1A with FIG. 1B). Other differences are due to reducing end residues: for instance, H2 resonances at about 3.1 and 3.2 ppm of β anomers of $A_{NS}$ and G respectively, while H1 resonance at 5.44 ppm is of the α anomer of $A_{NS}$ (Compare FIG. 1A with FIG. 1B).

A method combining $^1H$ and $^{13}C$ quantitative analysis of major and of some minor signals, originally set-up for UFHs, has been applied for γ-HO samples to estimate their sulfation pattern. The percentage of substitution of glucosamine and uronic acid residues of the three γ-HO fractions obtained in the different steps of Example 1 are reported in Table 2, in comparison with the average values obtained from ten preparations of unfractionated pig mucosal heparin.

TABLE 2

| Sample | $A_{NS}$-I | $A_{NS}$-G | $A_{NAc}$ | $A_{N,3,6S}$ | $A_{6S}{}^a$ | $I_{2S}$ | $I_{2OH}$ | G |
|---|---|---|---|---|---|---|---|---|
| UFH-a | 69 | 10 | 15 | 5 | 86 | 59 | 12 | 29 |
| γ-HO-a | 69 | 8 | 16 | 6 | 81 | 67 (5)$^b$ | 11 | 21 |
| γ-HO-a2 | 71 | 9 | 14 | 6 | 84 | 70 (5)$^b$ | 11 | 19 |
| γ-HO-a3 | 73 | 9 | 11 | 6 | 90 | 75 (4)$^b$ | 10 | 16 |

$^a$Values obtained by integration of $^{13}$C-NMR signals.
$^b$Values between brakets indicate the percentage of reducing 2-O-sulfated iduronic acid residues, which amounts are included in $I_{2S}$ percentage values.

Example 2

Example 1 was repeated adding a fourth irradiation step. Composition of the high $M_w$ (H3) and intermediate $M_w$ (γ-HO-a3) after third irradiation and separation was analysed and the results reported in table 3. H3 was subjected to a fourth irradiation and the composition of the obtained crude is reported.

TABLE 3

| | $A_{NS}$-I | $A_{NS}$-G | $A_{NAc}$ | $A_{N,3,6S}$ | $A_{6S}{}^*$ | $I_{2S}$ | $I_{2OH}$ | $I_{2S\text{-}red}$ | G |
|---|---|---|---|---|---|---|---|---|---|
| H3 | 59.9 | 8.3 | 27.1 | 4.7 | 91.3 | 67.2 | 10 | — | 19.6 |
| γ-HO-a3 | 74.2 | 8.2 | 12.4 | 5.4 | 90.5 | 66.1 | 15.9 | 0.46 | 18.1 |
| Crude 4th γ | 69.5 | 10.9 | 13.3 | 6.4 | 90.8 | 72.5 | 13.7 | 3.32 | 13.8 |

Example 3

Example 1 was repeated but the fraction γ-HO-a3 was further subjected to ion exchange chromatography according to the following procedure.

500 mg of γ-HO-a3 were dissolved in equilibrating solution, NH$_4$Cl 0.05 M, pH 7.4, loaded on QAE-Sephadex A25-120 column (2.5×5 cm) and fractionated into four fractions by eluting with a stepwise increasing concentration of NaCl (0.4, 0.6, 0.7, 0.8, 1.0 and 2.0 M) in 60 mL of equilibrating solution, at a flow rate of 0.8 mL/min. The corresponding fractions, γ-HO-a3-0.4, γ-HO-a3-0.6, γ-HO-a3-0.7, γ-HO-a3-0.8, γ-HO-a3-1.0, and γ-HO-a3-2.0, were desalted by gel permeation chromatography on Sephadex G10 and analysed for uronic acid content by carbazole reaction; their yields were 2, 9, 56, 19, 13, and 1%, respectively.

The analytical data of fraction γ-HO-a3-1.0 are:

| $A_{NS}$-I | $A_{NS}$-G | $A_{NAc}$ | $A_{N,3,6S}$ | $A_{6S}{}^*$ | $I_{2S}$ | $I_{2OH}$ | $I_{2S\text{-}red}$ | G |
|---|---|---|---|---|---|---|---|---|
| 63.6 | 16.5 | 8.4 | 11.4 | nd | 73.1 | 8.5 | nd | 18.4 |

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Therefore, the present invention is well adapted to attain the ends and advantages mentioned as well as those that are inherent therein. While numerous changes may be made by those skilled in the art, such changes are encompassed within the spirit of this invention as illustrated, in part, by the appended claims.

What is claimed is:

1. A depolymerized heparin having a content in $A_{NS,3S,6S}$ higher than 8% and a molecular weight between 1200 and 3000 daltons.

2. The depolymerized heparin of claim 1 wherein the molecular weight is between 1800 and 2800 daltons.

3. A method for the physical depolymerization of heparin comprising:

subjecting heparin to γ-ray irradiation to obtain a depolymerized heparin;
separating the depolymerized heparin to isolate a high molecular weight fraction of depolymerized heparin with a molecular weight greater than 3500 daltons;
subjecting the high molecular weight fraction of depolymerized heparin to γ-ray irradiation; and
separating the high molecular weight fraction of depolymerized heparin to isolate a fraction of depolymerized heparin having a content in $A_{NS,3S,6S}$ higher than 8%.

4. The method according to claim 3 wherein separating the depolymerized heparin to isolate a high molecular weight fraction of depolymerized heparin comprises subjecting the depolymerized heparin to gel permeation chromatography.

5. The method according to claim 3 wherein the fraction of depolymerized heparin having a content in $A_{NS,3S,6S}$ higher than 8% has a molecular weight between 1200 and 3000 daltons.

6. The method of claim 5 further comprising subjecting the fraction of depolymerized heparin with a content in $A_{NS,3S,6S}$ higher than 8% and a molecular weight between 1200 and 3000 daltons to γ-ray irradiation.

7. The method according to claim 5 wherein the fraction of depolymerized heparin with a content in $A_{NS,3S,6S}$ higher than 8% and a molecular weight between 1200 and 3000 daltons is further subjected to ion exchange chromatography to isolate fractions having different charge densities.

8. The method according to claim 3 wherein the γ-ray irradiation is performed in the presence of an organic compound selected from the group consisting of an alcohol, an ether, an aldehyde, an amide, a formic acid, and a combination thereof.

9. The method according to claim 8 wherein the organic compound is isopropanol and is used in a concentration of from 0.1 to 5% (v/v).

10. The method according to claim 8 wherein the organic compound is isopropanol and is used in a concentration of from 0.2 to 2% (v/v).

11. The method according to claim 3 wherein the γ-ray irradiation comprises a dose of radiation comprised between 50 and 300 kGy.

12. The method according to claim 3 wherein the γ-ray irradiation comprises a dose of radiation comprised between 100 and 200 kGy.

13. The method according to claim 3 wherein the heparin is in the form of a solution comprising a concentration of heparin in the range of about 2 to 25% (w/v).

* * * * *